United States Patent
Ohyama et al.

(10) Patent No.: US 6,626,779 B2
(45) Date of Patent: Sep. 30, 2003

(54) CONTINUOUSLY VARIABLE TRANSMISSION OIL PRESSURE CONTROL DEVICE

(75) Inventors: Eiji Ohyama, Wako (JP); Yoshimichi Tsubata, Wako (JP); Masahiro Kanda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 day.

(21) Appl. No.: 09/853,604

(22) Filed: May 14, 2001

(65) Prior Publication Data

US 2002/0019279 A1 Feb. 14, 2002

(30) Foreign Application Priority Data

Jul. 5, 2000 (JP) .................................... 2000-204309

(51) Int. Cl.$^7$ .............................................. F16H 61/00
(52) U.S. Cl. ...................................... 474/28; 474/18
(58) Field of Search .......................... 74/606 R; 474/18, 474/28, 51, 144

(56) References Cited

U.S. PATENT DOCUMENTS

| | | | | |
|---|---|---|---|---|
| 4,871,343 A | * | 10/1989 | Hattori | 474/28 |
| 4,926,716 A | * | 5/1990 | Hirano et al. | 477/49 |
| 4,995,283 A | * | 2/1991 | Sawasaki et al. | 477/48 |
| 5,078,662 A | * | 1/1992 | Taguchi et al. | 475/200 |
| 5,327,800 A | * | 7/1994 | Van Selous | 137/593 |
| 5,829,560 A | * | 11/1998 | Mainquist et al. | 137/540 |
| 6,155,138 A | * | 12/2000 | Yasunami | 74/606 R |
| 6,155,396 A | * | 12/2000 | Tsubata et al. | 192/85 R |

FOREIGN PATENT DOCUMENTS

JP 392661 * 4/1991 ............... 74/606 R

* cited by examiner

Primary Examiner—Thomas R. Hannon
Assistant Examiner—Vicky A. Johnson
(74) Attorney, Agent, or Firm—Armstrong, Westerman & Hattori, LLP

(57) ABSTRACT

In a belt type continuously variable transmission, the apertures 55a, 56a of the drain ports of an oil pressure control valve employed for control of hydraulic devices are arranged outside of the circumferential region $W_B$ of the range of movement in which the belt can be moved in the pulley axis direction when the pulley groove width is changed during gear change operation, or outside of the circumferential region $W_P$ of the region in which the V groove face of the pulley can be arranged when the pulley groove width is changed during gear change operation.

9 Claims, 7 Drawing Sheets

CONTINUOUSLY VARIABLE TRANSMISSION OIL PRESSURE CONTROL DEVICE

RELATED APPLICATIONS

This application claims the priority of Japanese Patent Application No.2000-204309 filed on Jul. 5, 2000, which is incorporated herein by reference.

BACKGROUND OF THE INVENTION

1. Field of the Invention

The present invention relates to a continuously variable transmission oil pressure control device and, more particularly, to an oil pressure control device in which the operating characteristic of a valve that is arranged in the continuously variable transmission is improved.

2. Description of the Related Art

Continuously variable transmissions comprising: a drive pulley and a driven pulley freely rotatably journalled within a transmission housing; a belt that transmits rotary force arranged between these pulleys; and an oil pressure actuator used to vary the width of the pulley groove of the drive pulley and driven pulley by moving moveable pulley halves of the drive pulley and driven pulley in the respective pulley axial directions and which is used to change the reduction ratio between the drive pulley side rotary shaft and driven pulley side rotary shaft in continuously variable fashion are employed for example as transmissions for vehicles.

In a continuously variable transmission for a vehicle, a plurality of oil pressure control valves such as a pulley control valve for controlling the groove width of the drive pulley and driven pulley by controlling lateral pressure acting on the moveable pulley half and/or a clutch control valve that effects engagement control of the clutch used in the transmission are employed; these oil pressure control valves are accommodated in the same housing as the continuously variable transmission mechanism comprising the drive pulley and driven pulley, etc., in order to achieve a compact construction of the transmission as a whole. Due to restrictions regarding arrangement space, etc., in some cases the drain ports of such oil pressure control valves are arranged on the line of extension of the circumference of the rotating pulley or the line of extension of the circumference of the rotating belt.

In order to suppress generation of heat resulting from friction between the drive pulley or driven pulley and the belt in the continuously variable transmission mechanism, transmission oil is supplied that lubricates these structural members; this transmission oil used for lubrication/cooling flies off in the circumferential direction of the rotary bodies constituted by the pulleys or the belts and collides with the inside wall of the transmission housing or oil pressure control valves, etc., which are on the line of extension of this circumferential direction. Consequently, if the aperture of the drain port in the oil pressure control valve was in a region on the line of extension of the circumferential direction referred to above, there was the problem that it could easily be affected by splashes of transmission oil flung out from the continuously variable transmission mechanism (the kinetic energy (dynamic pressure) possessed by the splashes acting for example as a back pressure causing fluctuation of the valve).

Construction of an oil pressure control device has been considered in which the valve body in the oil pressure control valve is arranged immersed in transmission oil within an oil pan, the aperture of the drain port in this oil pressure control valve being arranged in an in-oil region. With such a construction, the above problem can be alleviated. However, if the aperture of the drain port was arranged in an in-oil region, when, for example, the ambient temperature was low and the oil viscosity in the oil pan was therefore high, the oil present around the drain port aperture presented resistance to discharge, adversely affecting the response of the oil pressure control valve and leading to problems such as variability of the control characteristic of the controlled member (for example the clutch or drive/driven pulley) with oil temperature, or large moving-off shock when the vehicle moved off. Also, even if the drain port aperture was arranged in an in-oil region, the situation could arise in which the drain port was exposed to splashes by being exposed above the oil surface on shaking of the vehicle, driving while climbing or descending a slope, vehicle acceleration/deceleration, or when the oil surface fell with the viscosity being raised by low oil temperature, etc.

SUMMARY OF THE INVENTION

An object of the present invention is to provide a continuously variable transmission oil pressure control device wherein there is no possibility of this being affected by splashes of transmission oil flung out from the continuously variable transmission mechanism, even under such vehicle conditions.

The present invention comprises: a continuously variable transmission comprising: a drive pulley and driven pulley freely rotatably journalled in a housing and respectively having a pair of a fixed pulley half and moveable pulley half, a belt arranged between the drive pulley and driven pulley and that transmits rotational force between the drive pulley and driven pulley; an oil pressure actuator that varies the width of the pulley groove of the drive pulley and the driven pulley by moving the respective moveable pulley halves in the drive pulley and driven pulley in the respective pulley axis directions; wherein, in this continuously variable transmission, there is provided an oil pressure control valve having a drain port that opens in the interior of the housing. In addition, according to the present invention, an oil pressure control device of a continuously variable transmission is constituted wherein the apertures of the drain ports in an oil pressure control valve are arranged outside of the maximum range of movement (for example, belt range) defined by extension in the circumferential direction of the belt of the maximum width, for example the maximum width of the range of movement through which the belt can move in the pulley axis direction, of the range of movement when the pulley groove width of the drive pulley and driven pulley is changed by moving the moveable pulley halves of the drive pulley and driven pulley, and towards the outside of the belt region.

As is well known, the gear-change action in a continuously variable transmission as described above is performed by varying the radius with which the belt is wound on the respective pulleys by changing the width of the pulley grooves (V groove width: separation between the V face of the fixed pulley half and the V face of the movable pulley half of both the drive pulley and driven pulley, which have respectively tapered V-groove faces. The positional relationship of the moveable pulley halves in the drive pulley and driven pulley is usually such that the respective V faces are arranged so as to be opposite on the two pulley shafts which are arranged parallel to each other, so that, when gear-change operation is effected, the belt is moved parallel with the pulley axis direction.

In the above construction according to the present invention, the aperture of the drain port in the oil pressure control valve is arranged outside of the belt region defined by extending the maximum width of the range of movement in which the belt can be moved in the pulley axis direction in the circumferential direction of the belt. The maximum width of the range of movement in which the belt can be moved in the pulley axis direction means the maximum width of the positions which the two ends of the belt can take when a belt having a fixed width in the pulley axis direction is moved in the pulley axis direction by the gear-change operation, and the belt region defined by extending this maximum width in the circumferential direction of the belt means the region in which direct collision with oil splashes flung off by centrifugal force from the rotating belt is possible.

Consequently, with a construction according to the present invention in which the aperture of the drain port in the oil pressure control valve is arranged outside this belt region, an oil pressure control device of a continuously variable transmission can be provided wherein there is no possibility of oil splashes flung off from the rotating belt colliding with the drain port aperture, so there is no possibility of this being subjected to the effect of oil splashes as described above.

According to the present invention, the maximum range of movement defined by extending in the circumferential direction of the drive pulley or driven pulley the range of arrangement of the pulley grooves in which the pulley grooves of the drive pulley or driven pulley can be arranged when the pulley groove width of the drive pulley and driven pulley is varied by moving the moveable pulley halves of the drive pulley and driven pulley, i.e., the groove width region, can be set, the oil pressure control device of the continuously variable transmission being constructed with the aperture of the drain port in the oil pressure control valve being arranged outside of this groove width region.

With the above construction, the aperture of the drain port in the oil pressure control valve is arranged outside the groove width region defined by extending in the circumferential direction of these pulleys the range of arrangement of the pulley groove in which the pulley groove of the drive pulley or driven pulley can be arranged. The range of the arrangement of the pulley groove in which the pulley groove can be arranged means the range in which the pulley groove that is formed by the V face of the fixed pulley half and the V face of the movable pulley half can be arranged; specifically, it means the range defined by the position of the circumferential edge of the V face in the fixed pulley half and the position that can be taken by the circumferential edge of the V face of the movable pulley half when this is moved by a gear-change operation. Specifically, the groove width region defined by extension of the range of arrangement of the pulley grooves in the circumferential direction of the pulleys means the range in which direct collision with oil splashes flung out from the circumferential edges of the V faces after traveling over the V faces of the rotating pulleys is possible.

Consequently, with a construction according to the present invention in which the aperture of the drain port in the oil pressure control valve is arranged outside the groove width region, a continuously variable transmission oil pressure control device can be provided in which there is no possibility of collision of oil splashes flung out from the rotating drive pulley or driven pulley with the drain port aperture, and which is, therefore, not subject to the effects of oil splashes as described above. If the groove width regions are different as between the drive pulley and driven pulley, depending on the positional relationship with the aperture of the drain port, etc., outside of either one of the groove width regions may be designated or outside of both of the groove width regions may be designated.

In the above construction, preferably the continuously variable transmission oil pressure control device is constructed such that the valve body of the oil pressure control valve is immersed in the oil constituting the fluid that is the subject of control in the bottom part of the interior of the housing (for example in this embodiment, the transmission oil), and the aperture of the drain port opens above the oil surface. With this construction, because the valve body of the oil pressure control valve is immersed in the oil, there is no possibility of air being sucked into the valve, yet, since the aperture of the drain port is formed above the oil surface, even if the oil viscosity is high due to low oil temperature, there is no possibility of the response of the oil pressure control valve being adversely affected by resistance to discharge by surrounding oil. Consequently, a continuously variable transmission oil pressure control device can be provided that cannot be affected by splashes of transmission oil flung out from the transmission mechanism and wherein the control characteristic of the items of equipment to be controlled is little changed by the temperature of the transmission oil.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 6:
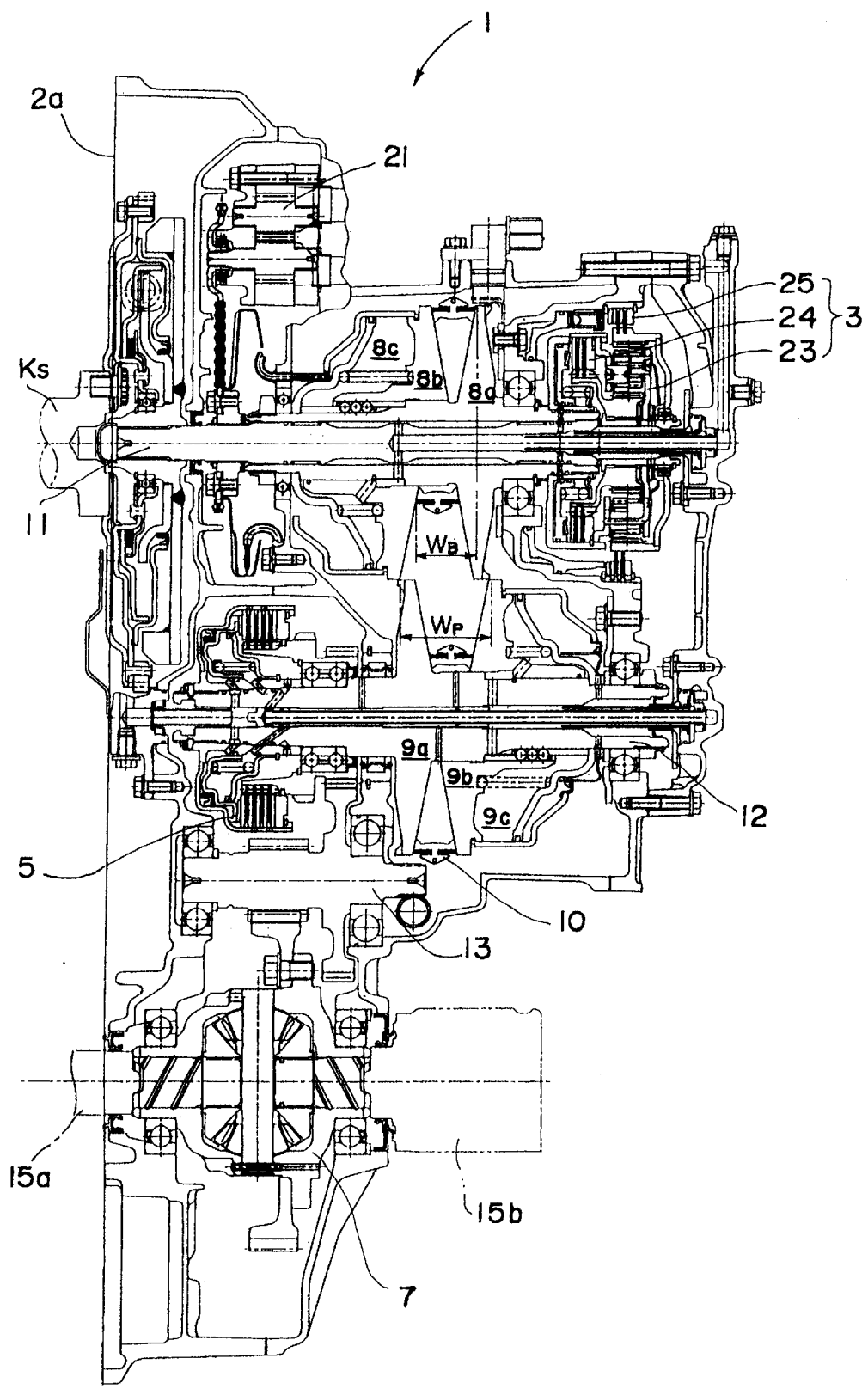
FIG. 6 is a layout diagram of a continuously variable transmission provided with an oil pressure control device according to the present invention.
Figure 7:
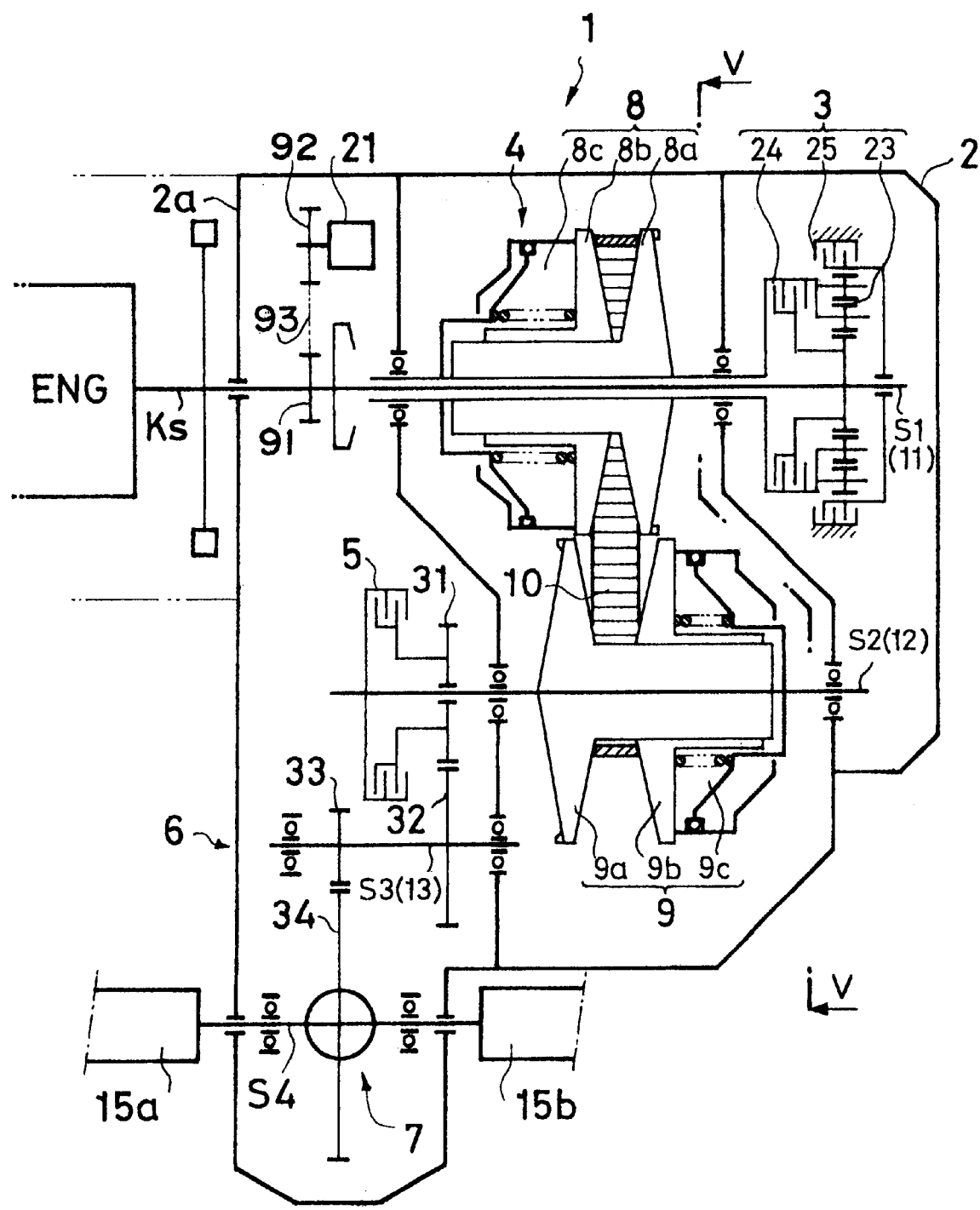
FIG. 7 is an overall view of a continuously variable transmission provided with an oil pressure control device according to the present invention.

Preferred embodiments of the present invention are described below with reference to the drawings. FIG. 6 and FIG. 7 illustrate the construction of a belt type continuously variable transmission 1 (hereinbelow termed a continuously variable transmission) constituting a preferred embodiment of a continuously variable transmission provided with an oil pressure control device according to the present invention. Continuously variable transmission 1 is constituted comprising forwards/reverse drive changeover mechanism 3 within transmission housing 2, belt type continuously variable transmission mechanism (hereinbelow called continuously variable transmission mechanism) 4, moving-off clutch 5, reduction mechanism 6, and differential mechanism 7, etc. Joining face 2a on the left-hand side of transmission housing 2 in the figure is joined to an engine, not shown, and the input shaft 11 of continuously variable transmission 1 is connected with the engine crankshaft Ks through a flywheel, so that rotary drive force of the engine is transmitted to the continuously variable transmission 1.

The direction of rotation of rotary drive force transmitted to input shaft 11 is selectively changed over by means of forwards/reverse changeover mechanism 3 comprising planetary gear 23 arranged on first axis S1, forward clutch 24, and reverse brake 25; drive pulley 8 arranged coaxially on this shaft S1 is thereby rotated. Continuously variable transmission mechanism comprising drive pulley 8, belt 10 and driven pulley 9 is constituted between first axis S1 and second axis S2, so that rotary drive force transmitted to drive pulley 8 is transmitted through metal belt 10 with a prescribed rotational speed ratio to driven pulley 9 on second axis S2.

Moving-off clutch 5 is arranged coaxially with driven pulley 9 on second axis S2, so that rotary drive force is transmitted to gear 31 by frictional engagement of moving-off clutch 5. Gear 32 on third axis S3 meshes with gear 31 and is integrally formed with gear 33 on this shaft, so that rotary drive force transmitted to gear 31 is transmitted to axle shafts 15a, 15b on fourth axis S4 through gear train 31, 32, 33, 34 and differential mechanism 7 constituting reduction mechanism 6, thereby driving left and right drive wheels, not shown, in rotation.

All the rotary shafts from first axis S1 to fourth axis S4 are arranged mutually parallel and all the members on the shafts are freely rotatably supported within transmission housing 2. The axes described as first axis S1 to fourth axis S4 mean the central axes of rotation of the rotary bodies arranged on the same axis and do not denote the individual shaft members themselves such as the input shaft 11 or pulley shaft.

Drive pulley 8 on first axis S1 comprises a fixed pulley half 8a that supports in a manner such that it is free for relative rotation input shaft 11 that passes through the axis thereof and that is freely rotatably supported in transmission housing 2, and moveable pulley half 8b that is arranged to be freely slidable in the axial direction on the pulley shaft of fixed pulley half 8a, and a cylinder chamber 8c, etc., that effects sliding movement of moveable pulley half 8b in the pulley shaft direction and is constituted by an oil cylinder provided to the rear of moveable pulley half 8 (corresponding to the oil actuator in the claims).

Oil pressure is applied to cylinder chamber 8c through an oil path performed in input shaft 11 passing through the axis of the drive pulley 8 and an oil path provided in fixed pulley half 8a. Oil paths are constituted that supply oil from the oil path passing through the axis of input shaft 11 also to planetary gear 23 and forward clutch 24 etc, between relatively rotating input shaft 11 and fixed pulley half 8a and between fixed pulley half 8a and moving pulley half 8b, the construction being such that lubrication of these rotary bodies is also thereby effected.

Driven pulley 9 arranged on second axis S2 comprises fixed pulley half 9a that is freely rotatably supported in transmission housing 2, moveable pulley half 9b that is arranged to be freely slidable in the axial direction on the pulley shaft of this fixed pulley half 9a, and a cylinder chamber 9c constituted by an oil cylinder (corresponding to the oil pressure actuator in the claims) provided to the rear of the movable pulley half and that effects sliding movement of moveable pulley half 9b in the pulley axis direction. Moveable pulley half 9b of driven pulley 9 is arranged such that its V face is opposite to the moveable pulley half 8b of drive pulley 8, i.e., such that the positional relationship of the movable pulley half and fixed pulley half in the drive pulley 8 and driven pulley 9 is that these are arranged oppositely to left and right in the Figure.

Oil pressure is supplied to cylinder chamber 9c through an oil path formed in shaft 12 of fixed pulley half 9a constituting the pulley shaft of driven pulley 9. From the oil path passing through the axis of shaft 12, an oil path is constituted that supplies oil between fixed pulley half 9a and moveable pulley half 9b and also to the inner circumferential side of belt 10 and gear 31 etc, the construction being such that lubrication of these rotary bodies is thereby also effected.

Continuously variable transmission mechanism 4 is constituted by arranging belt 10 between drive pulley 8 and driven pulley 9. Control of the ratio of rotary speeds speeds in continuously variable transmission mechanism 4 is effected by changing the balance of the drive pulley thrust pressure supplied to cylinder chamber 8c of drive pulley 8 and the driven pulley thrust pressure supplied to cylinder 9c of driven pulley 9. For example, control is effected by maintaining the driven pulley thrust pressure at a fixed constant pressure (for example line pressure) and varying the drive pulley thrust pressure.

For example, if the drive pulley thrust pressure supplied to cylinder chamber 8c is made high, movable pulley half 8b performs sliding movement in the direction of fixed pulley half 8a along the pulley shaft, causing the V groove width of drive pulley 8 to become narrower. Belt 10 is thereby pushed out in the circumferential direction to a position where the V groove width and the belt width coincide, thereby increasing the radius at which the belt runs round the pulley. When this happens, since the overall length of belt 10 is fixed, the groove width of driven pulley 9 is expanded by the action of the belt tension (movable pulley 9b is displaced by the pressing force), causing the radius with which the belt runs round the driven pulley side to become smaller. In other words, the rotational speed ratio in continuously variable transmission mechanism 4 is changed to what would be the LOW side in a stepped transmission. In contrast, if the drive pulley thrust pressure is made relatively low, the opposite action takes place, with the result that the rotational speed ratio in continuously variable transmission mechanism 4 changes to the TOP side. In this way, the rotational speed ratio can be controlled in continuous fashion by altering the ratio of the radii with which the belt runs round the pulleys at will by controlling the relative pressure difference of the oil pressures acting on the two moveable pulleys.

Figure 5:
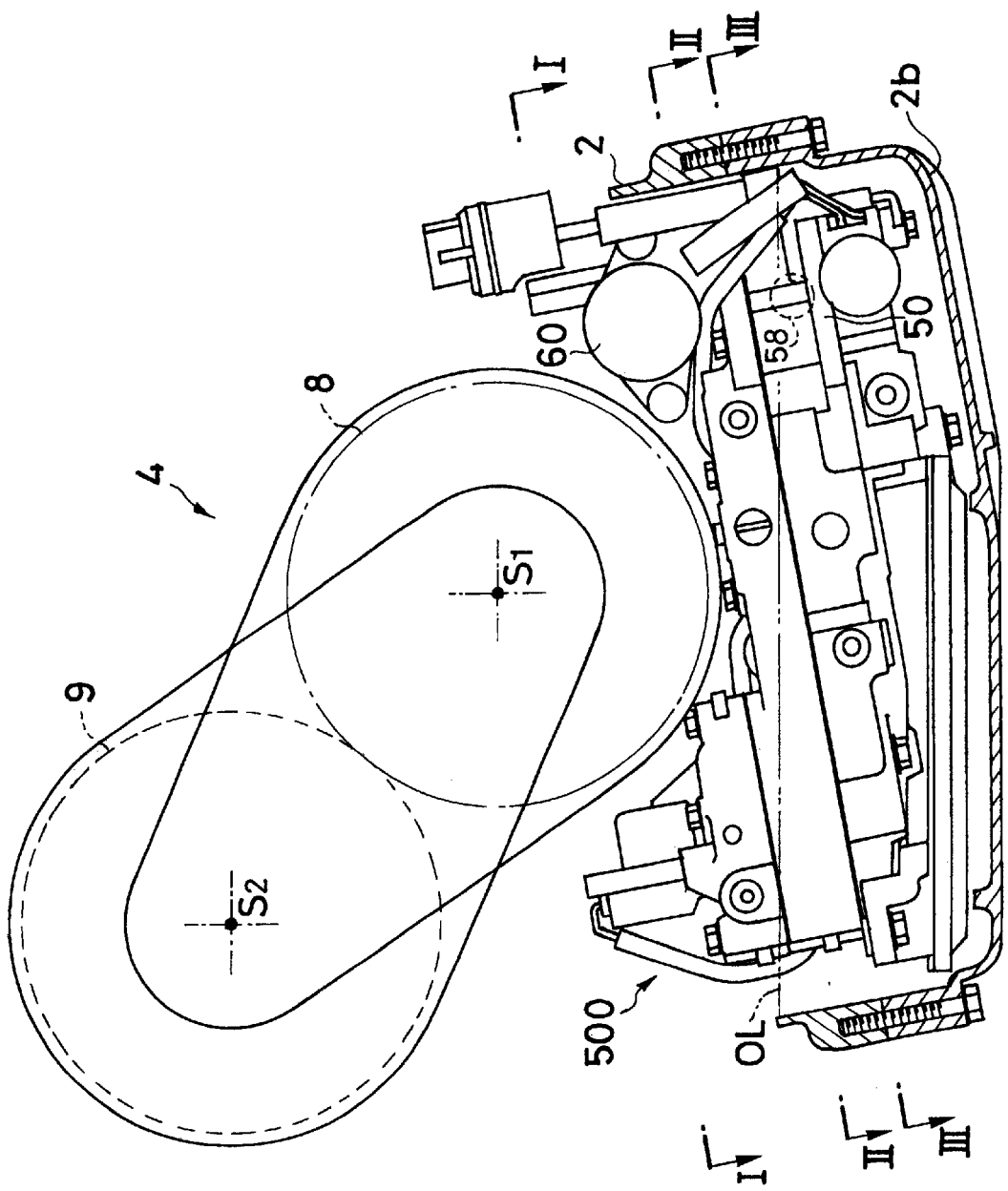
FIG. 5 is a partial cross-sectional side view (cross-sectional view V—V in FIG. 7) of a continuously variable transmission provided with an oil pressure control device according to the present invention.

The transmission oil is employed as actuating/lubricating fluid that applies oil pressure to the hydraulic devices such as the cylinder chambers and clutches, etc., described above, or that lubricates the various parts. As shown in FIG. 5, an oil pan 2b in which transmission oil is accumulated is mounted below transmission mechanism 4 and a lower valve assembly 500 that controls the operation of the oil equipment is mounted between transmission mechanism 4 and oil pan 2b. As indicated by the double-dotted chain line in FIG. 5 which shows the oil level OL under stationary conditions of the transmission oil, practically all of the body of the lower valve assembly 500 is immersed in the oil.

Oil pressure generated by oil pump 21 that is driven in rotation by means of chain 93 and sprocket wheels 92 from sprocket wheel 91 mounted on input shaft 11 is supplied to lower valve assembly 500, and lower valve assembly 500 controls the various hydraulic devices by controlling the operation of the various oil pressure control valves arranged within the body.

Figure 4:
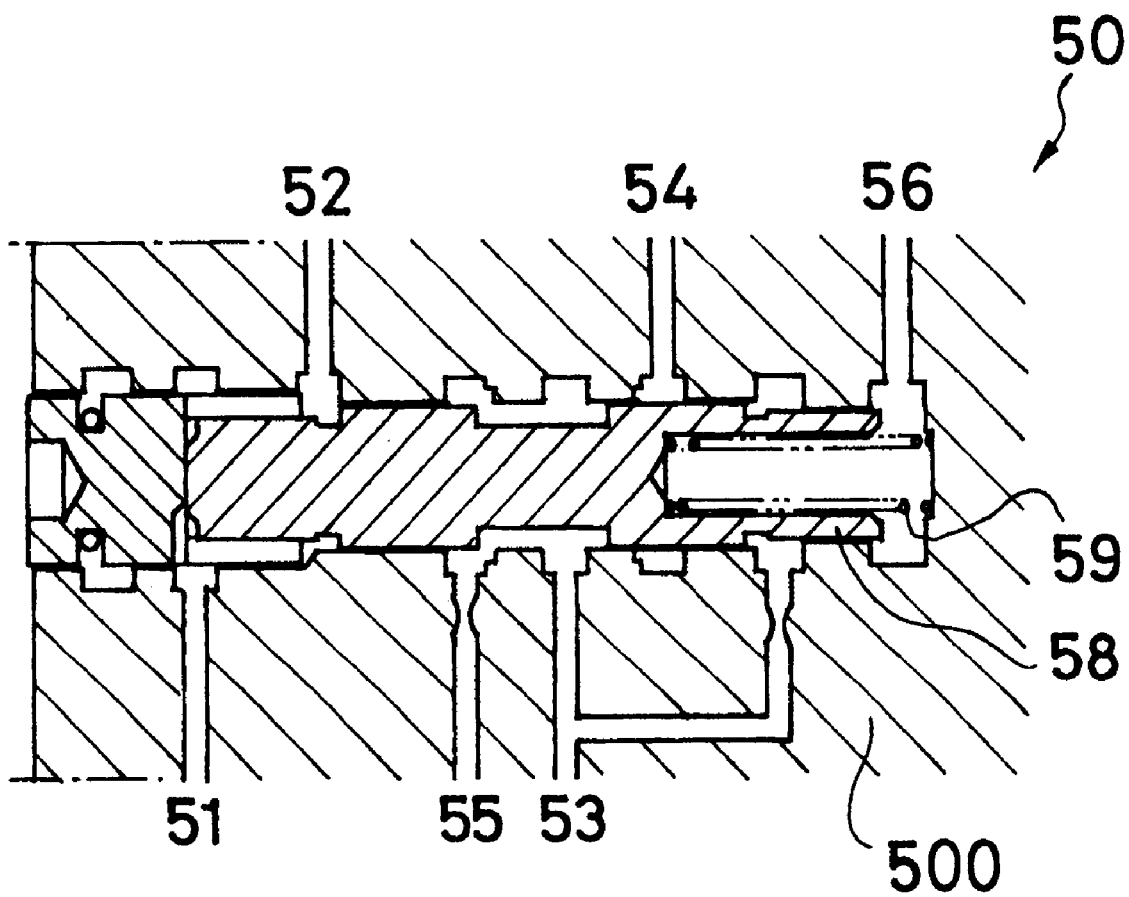
FIG. 4 is a diagram in which the above oil pressure control valve is represented in the form of symbols.

One type of oil pressure control valve provided in lower valve assembly 500 is the clutch pressure control valve 50 that performs operating control of moving-off clutch 5. Clutch pressure control valve 50 is represented symbolically in FIG. 4; a spool 58 that is freely slidable in the axial direction is arranged within a spool cavity formed in a valve body, and spool 58 is biased leftwards in the drawing by means of a spring 59. Valve 50 is formed with two signal pressure ports 51, 52, line pressure supply port 53 whereby line pressure is supplied, clutch pressure output port 54 that outputs clutch control oil pressure adjusted in pressure by means of a signal pressure, and drain ports 55 and 56; these are connected by respective oil paths 55' and 56'.

Line pressure adjusted to a prescribed fixed pressure is supplied by a regulator valve, not shown, at line pressure supply port 53, and the position of displacement of spool 58 is changed by changing the signal pressure applied at signal pressure supplied ports 51 and 52, thereby performing pressure adjustment control of the clutch control oil pressure that is output to clutch pressure output port 54 and so controlling frictional engagement of moving-off clutch 5. When the moving-off clutch is not engaged, line pressure is drained from drain port (exhaust port) 55; drain port 56 drains oil leakage from a land thereof and is opened so as to present no resistance when spool 58 is displaced.

Figure 2:
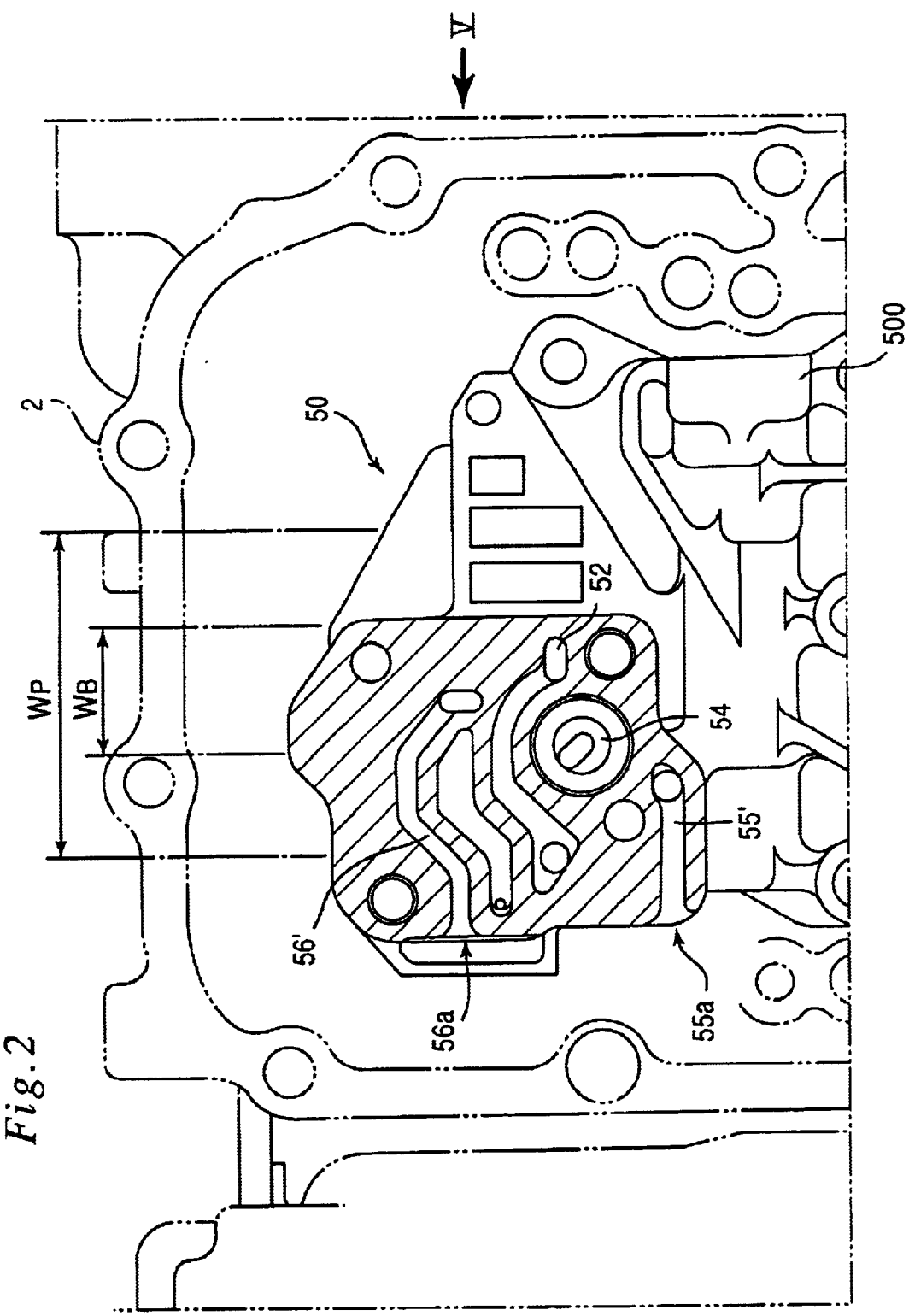
FIG. 2 is a cross-sectional view of the above oil pressure control valve (view seen in the direction of arrow II in FIG. 5), being a cross-sectional view illustrating the relationship between the condition of formation of the drain port aperture and the belt region and groove width region.
Figure 3:
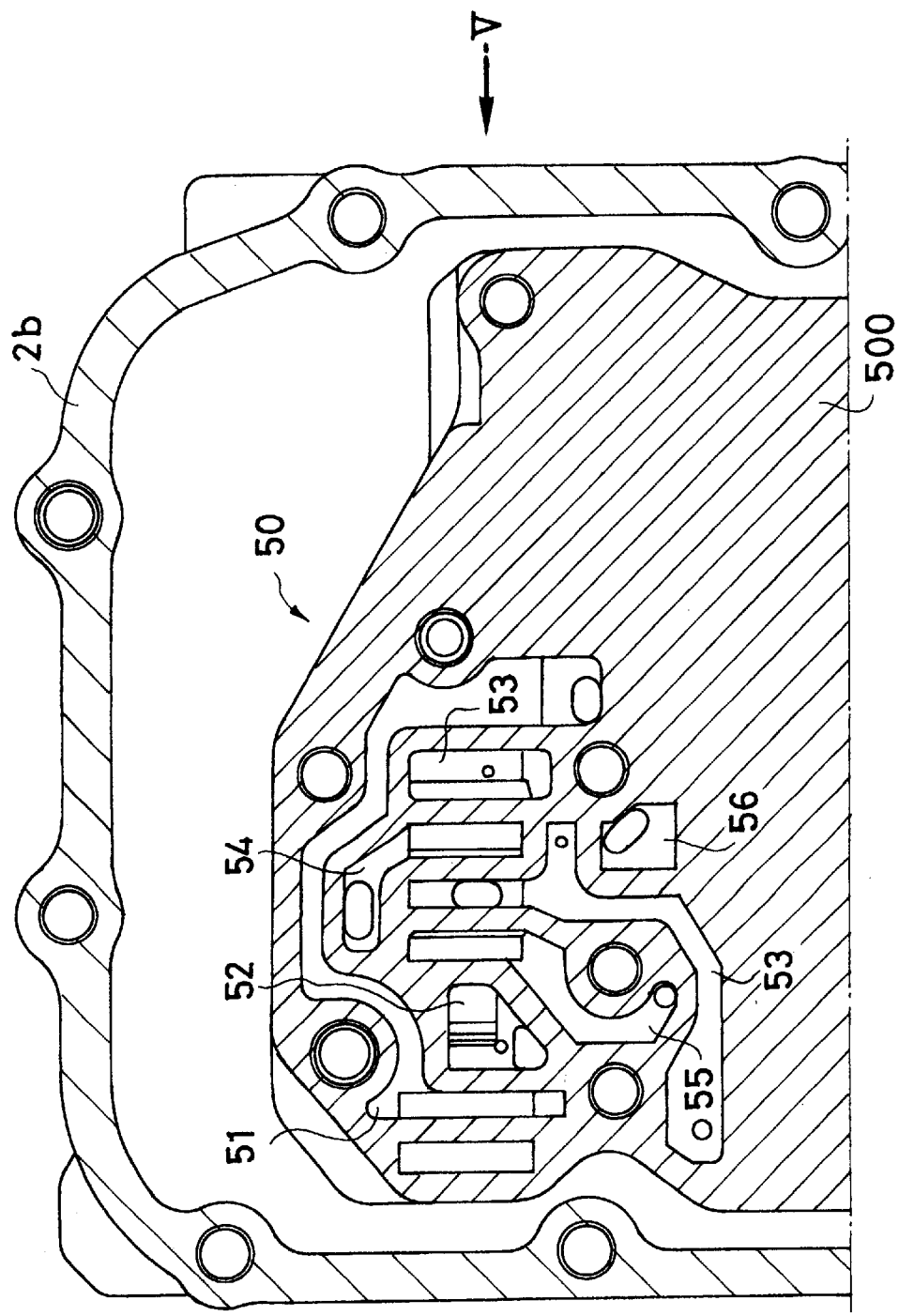
FIG. 3 is a cross-sectional view (view seen along the direction of the arrow III) directly above the spool in the above oil pressure control valve, being a cross-sectional view illustrating the condition of arrangement of each port in the oil pressure control valve and the condition of formation of the oil path from the drain port.

FIG. 2 and FIG. 3 are cross-sectional views wherein the condition of arrangement of the oil paths of the various ports in an actual clutch pressure control valve 50 is seen in cross-sections shown in the direction of arrows II and III, respectively, in FIG. 5. The cross-sectional view of arrow III shown in FIG. 3 is a cross-sectional view of the valve body sectioned directly above spool 58; it shows the respective ports 51 to 55 described above (drain port 56 is formed at a level further therebelow) and the connecting oil paths of the various ports formed in recessed fashion in the valve body. As shown in FIG. 5, the oil level of the transmission oil is at a height practically in the vicinity of this cross-section and spool 58 is arranged below the oil level.

The cross-sectional view shown in FIG. 2 is a cross-sectional view of the valve body sectioned at a level above that of FIG. 3; of the connecting oil paths of the various ports 51 to 56, signal pressure supply port 52, clutch pressure output port 54 and the connecting oil paths of two drain ports 55 and 56 lead upwards from the cross section of FIG. 2 described above and appear on this cross-section. Drain ports 55 and 56 are connected with apertures 55a and 56a formed on the left-hand side face in the Figure by means of oil paths 55' and 56' formed in recessed fashion on this cross-section. As shown in FIG. 5, the position of this cross-section is higher than the oil level of the transmission oil, so the apertures 55a and 56a of drain ports 55 and 56 open into the air from the body side face.

Figure 1:
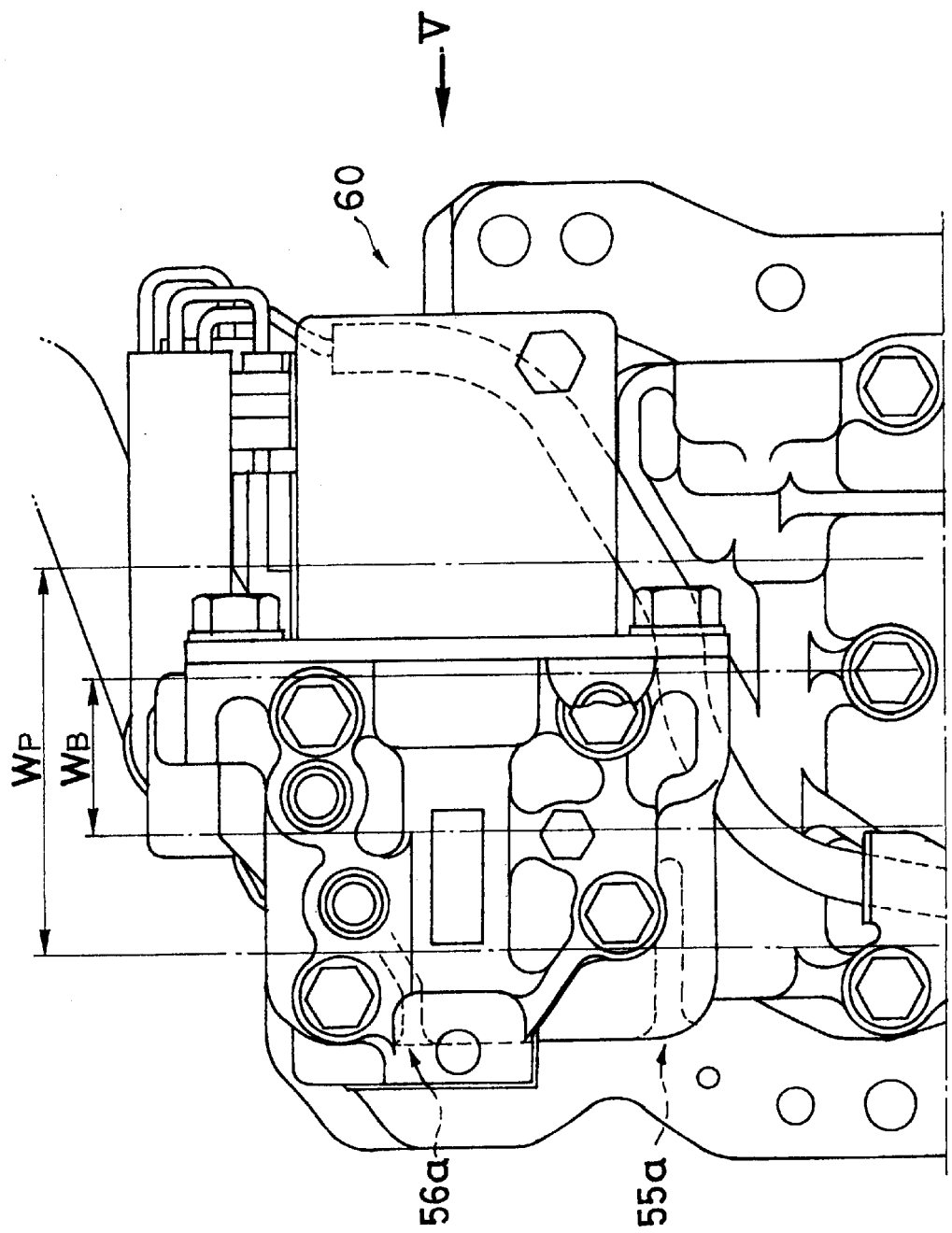
FIG. 1 is a top view of a valve assembly including an oil pressure control valve in an oil pressure control device according to the present invention (view seen in the direction of arrow I in FIG. 5), being an explanatory view illustrating the relationship between the position of the drain port aperture and belt region and groove width region.

The external view shown in FIG. 1 is a top view of lower valve assembly 500 seen in the direction of arrow I in FIG. 5. As shown in this Figure, a solenoid valve 60 that supplies signal pressure to the clutch pressure control valve is mounted above the cross-section shown in FIG. 2 and the drain port apertures 55a and 56a are covered by the valve body of solenoid valve 60.

Next, the positional relationship of apertures 55a and 56a and continuously variable transmission mechanism 4 in the horizontal direction will be described. As described above, in continuously variable transmission mechanism 4, the rotational speed ratio is varied in continuous fashion by changing the ratio of the radii with which belt 10 is wound round the pulleys by changing the width of the V grooves of the drive pulley 8 and driven pulley 9. When the rotational speed ratio is changed in this way, the movable pulleys 8a and 9a of the drive pulley 8 and driven pulley 9 are displaced as shown in FIG. 6 with their respective V groove widths being simultaneously a minimum and a maximum, while belt 10 is displaced parallel with the pulley axis directions as shown in this Figure.

A lubricating oil path that communicates with the oil path passing through the axis of the pulley shaft is formed in the bottom face of the V groove of driven pulley 9 (shaft 12 of fixed pulley half 9a) and transmission oil is injected from the aperture of this lubricating oil path towards the inner circumference of belt 10.

Consequently, transmission oil splashes are thrown in the direction at right angles to the pulley shaft from the rotating belt 10, centered on the regions where the belt is wound on to the pulley and these splashes collide with the inner surface of the transmission housing 2 and/or lower valve assembly 500 which are located in a region on the line of extension of the peripheral direction of the belt. Also, transmission oil transmitted over the V groove face from drive pulley 8 or driven pulley 9 is flung by centrifugal force in a direction at right angles to the pulley shaft from the circumferential edge, and collides with the inner surface of transmission housing 2 and/or lower valve assembly 500 located in a region on the line of extension thereof in the circumferential direction of the V groove face.

If the regions with which such oil splashes of high kinetic energy can collide are designated as belt region $W_B$, i.e., the region on the line of extension in the circumferential direction of the belt and groove width region $W_P$, i.e., the region on the line of extension in the circumferential direction of the V groove, these have the widths indicated respectively by $W_B$ and $W_P$ in FIG. 6, these corresponding to the regions extending in the circumferential direction at right angles to the two pulley shafts.

In FIG. 1 and FIG. 2, there are shown both the belt region $W_B$ and the groove width region $W_P$ with respect to the lower valve assembly 500 that is arranged directly below drive pulley 8; these regions are in a positional relationship such as to cut transversely across the upper part of clutch pressure control valve 50 at right angles to the valve spool. Therefore, if, for example, drain port 55 opens directly above after passing through the valve body of solenoid valve 60 or opens on the underside in FIG. 2, there is a risk of its being affected by oil splashes flung off the pulley.

However, as can be seen from these two Figures, the apertures 55a and 56a of drain ports 55 and 56 of the clutch pressure control valve 50 are both outside the belt region $W_B$ and outside the groove width region $W_P$, and open at the side face towards the outside of the groove width region, so there is no risk of their being affected by oil splashes. Also, because these apertures open into the air rather than into the oil of the transmission oil, even if, for example, the viscosity of the oil in the oil pan is high due to the ambient temperature being low, there is no possibility of the response characteristic of the oil pressure control valve being adversely affected due to resistance being presented to discharge of oil in the vicinity of the apertures.

It should be noted that, although, in the above, the groove width region $W_P$ was taken as being the maximum groove width region that could be subtended by the V groove faces of both drive pulley 8 and driven pulley 9 (region between the maximum width position of the movable pulley in the drive pulley and the maximum width position of the movable pulley in the driven pulley), depending on the positional relationship of the two pulleys and the oil pressure control valve (for example, when the oil pressure control valve is seen from the driven pulley, a positional relationship such as to be in the shadow of the drive pulley such that oil splashes cannot directly reach this from the driven pulley), the groove width positions that are capable of being subtended exclusively by the V groove face of the pulley whose oil splashes act directly could also be employed as the groove width region $W_P$.

Also, although, as one example of an oil pressure control valve according to the present invention, the example was described of a clutch oil pressure control valve 50 wherein the oil pressure of the moving-off clutch was controlled by signal oil pressure, a similar construction could be adopted even in the case of an oil pressure control valve of another type, such as, for example, a linear solenoid valve wherein the degree of valve opening is controlled electromagnetically, and the same benefits obtained. Furthermore, although this embodiment illustrated an example in which the oil pressure control valve was arranged in an oil pan, the present invention is not restricted to a valve in such a position and could likewise be applied so long as the valve is arranged in a region on the line of extension in the circumferential direction of the belt or pulley.

As described above, the present invention comprises a continuously variable transmission oil pressure control device having a drive pulley and driven pulley freely rotatably journalled in a housing, a belt arranged between these to transmit rotational force, and an oil pressure actuator that changes the width of the pulley grooves by moving the moveable pulley halves of the two pulleys respectively in the pulley axis directions, an oil pressure control valve being provided having a drain port that opens within the interior of the housing; in which the drain port aperture in the hydraulic pressure control valve is arranged outside the belt region defined by extension in the circumferential direction of the belt of the maximum width of the range of movement through which the belt is capable of moving in the pulley axial direction when the pulley groove width of the drive pulley and driven pulley is changed and towards outside the belt region. A continuously variable transmission oil pressure control device can therefore be provided in which there is no possibility of oil splashes flung out from the rotating belt colliding with the drain port aperture, whatever the condition of the vehicle, and which is therefore not subject to effects such as variation of back pressure.

According to a further aspect of the present invention a continuously variable transmission oil pressure control device as described above comprises an oil pressure control valve having a drain port aperture in the interior of the housing in which the aperture of the drain port in the oil pressure control valve is arranged outside the groove width region defined by extending in the circumferential direction of the drive pulley or driven pulley the range of arrangement of the pulley groove in which the pulley groove of the drive pulley or driven pulley can be arranged when the pulley groove width of the drive pulley or driven pulley is varied, and facing towards outside the groove width region. A continuously variable transmission oil pressure control device can therefore be provided in which there is no possibility of oil splashes flung out from the rotating drive pulley or driven pulley colliding with the drain port aperture, and which is therefore not subject to effects such as variation of back pressure.

It should be noted that, in each of the above inventions, it is desirable that the continuously variable transmission oil pressure control device should be constructed such that the valve body of the oil pressure control valve is immersed in the oil that constitutes the fluid that is the subject of control in the bottom part within the housing, and that the aperture of the drain port is open above the oil surface of the oil. With such an arrangement, there is no possibility of sucking in etc of air from the drain port occurring, since the valve body of the oil pressure control valve is immersed in the oil, and, since the aperture of the drain port is formed above the oil surface, even if the viscosity of the oil is high due to low oil temperature, there is no possibility of the response characteristic of the oil pressure control valve being adversely affected due to resistance to discharge being presented by surrounding oil. Consequently, a continuously variable transmission oil pressure control device can be provided which cannot be affected by splashes of transmission oil flung out from the continuously variable transmission and in which the control characteristic of the items of equipment to be controlled is little changed by the temperature of the transmission oil.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil pressure control device of a continuously variable transmission comprising:

a drive pulley and driven pulley freely rotatably journalled in a housing and respectively having a pair of a fixed pulley half and moveable pulley half;

a belt arranged between said drive pulley and said driven pulley and that transmits rotational force between said drive pulley and said driven pulley;

an oil pressure actuator that varies the width of the pulley groove of said drive pulley and said driven pulley by moving respective said moveable pulley halves in said drive pulley and said driven pulley in the respective pulley axis directions; and an oil pressure control valve having at least one drain port that opens within said housing in said continuously variable transmission, wherein the aperture of the drain port in said oil pressure control valve is positioned outside the region of maximum movement set by extending in the circumferential direction the maximum width of the region of movement in which said belt is capable of moving in said pulley axis direction when the pulley groove width of said drive pulley and said driven pulley is changed by moving the moveable pulley halves of said drive pulley and said driven pulley, wherein said oil pressure control valve is arranged in a region on the line of extension in the circumferential direction of said belt, and wherein the valve body of said oil pressure control valve is immersed in oil at the bottom of the interior of said housing and the aperture of said drain port opens above the oil level of said oil.

2. The oil pressure control device according to claim 1, wherein the aperture of said drain port opens in a direction offset from the direction facing oil flung out with rotation of said drive pulley, said driven pulley and said belt.

3. The oil pressure control device according to claim 2, wherein the aperture of said drain port opens from said region of maximum movement towards the outside in said pulley axis direction.

4. The oil pressure control device according to claim 1, wherein the oil pressure control valve is operated hydraulically.

5. An oil pressure control device of a continuously variable transmission comprising:

a drive pulley and driven pulley freely rotatably journalled in a housing and respectively having a pair of a fixed pulley half and moveable pulley half;

a belt arranged between said drive pulley and said driven pulley and that transmits rotational force between said drive pulley and said driven pulley;

an oil pressure actuator that varies the width of the pulley groove of said drive pulley and said driven pulley by moving respective said moveable pulley halves in said drive pulley and said driven pulley in the respective pulley axis directions; and an oil pressure control valve having at least one drain port that opens within said housing in said continuously variable transmission, wherein the aperture of the drain port in said oil pressure control valve is positioned outside the region of maximum movement set by extending in the circumferential direction the range of arrangement of the pulley grooves in which the pulley grooves of said drive pulley or said driven pulley can be arranged when the pulley groove width of said drive pulley and said driven pulley is changed by moving the moveable pulley halves of the said drive pulley and said driven pulley, wherein said oil pressure control valve is arranged in a region on the line of extension in the circumferential direction of at least one of said drive pulley and said driven pulley, and wherein the valve body of said oil pressure control valve is immersed in oil at the bottom of the interior of said housing and the aperture of said drain port opens above the oil level of said oil.

6. The oil pressure control device according to claim 5, wherein the aperture of said drain port opens in a direction offset from the direction facing oil flung out with rotation of said drive pulley, said driven pulley and said belt.

7. The oil pressure control device according to claim 5, wherein the oil pressure control valve is operated hydraulically.

8. An oil pressure control device of a continuously variable transmission comprising:

a drive pulley and driven pulley freely rotatably journalled in a housing and respectively having a pair of a fixed pulley half and moveable pulley half;

a belt arranged between said drive pulley and said driven pulley and that transmits rotational force between said drive pulley and said driven pulley;

an oil pressure actuator that varies the width of the pulley groove of said drive pulley and said driven pulley by moving respective said moveable pulley halves in said drive pulley and said driven pulley in the respective pulley axis directions; and an oil pressure control valve having at least one drain port that opens within said housing in said continuously variable transmission, wherein the aperture of the drain port in said oil pressure control valve is positioned outside the region of maximum movement set by extending in the circumferential direction the maximum width of the region of movement in which said belt is capable of moving in said pulley axis direction when the pulley groove width of said drive pulley and said driven pulley is changed by moving the moveable pulley halves of said drive pulley and said driven pulley, wherein said oil pressure control valve is arranged in a region on the line of extension in the circumferential direction of said belt, and wherein the oil pressure control valve comprises a clutch pressure control valve having first and second drain ports, wherein line pressure is drained from the first drain port and oil leak from the land of the valve is drained from the second drain port.

9. An oil pressure control device of a continuously variable transmission comprising:

a drive pulley and driven pulley freely rotatably journalled in a housing and respectively having a pair of a fixed pulley half and moveable pulley half;

a belt arranged between said drive pulley and said driven pulley and that transmits rotational force between said drive pulley and said driven pulley;

an oil pressure actuator that varies the width of the pulley groove of said drive pulley and said driven pulley by moving respective said moveable pulley halves in said drive pulley and said driven pulley in the respective pulley axis directions; and an oil pressure control valve having at least one drain port that opens within said housing in said continuously variable transmission, wherein the aperture of the drain port in said oil pressure control valve is positioned outside the region of maximum movement set by extending in the circumferential direction the range of arrangement of the pulley grooves in which the pulley grooves of said drive pulley or said driven pulley can be arranged when the pulley groove width of said drive pulley and said driven pulley is changed by moving the moveable pulley halves of the said drive pulley and said driven pulley, wherein said oil pressure control valve is arranged in a region on the line of extension in the circumferential direction of at least one of said drive pulley and said driven pulley, and wherein the oil pressure control valve comprises a clutch pressure control valve having first and second drain ports, wherein line pressure is drained from the first drain port and oil leak from the land of the valve is drained from the second drain port.

* * * * *